Sept. 26, 1944.   R. F. ROPER   2,359,051
AIR CONDITIONING APPARATUS
Filed Oct. 24, 1941   9 Sheets-Sheet 1

Inventor:
Richard F. Roper,
By Cushman Darby Cushman
Attorneys.

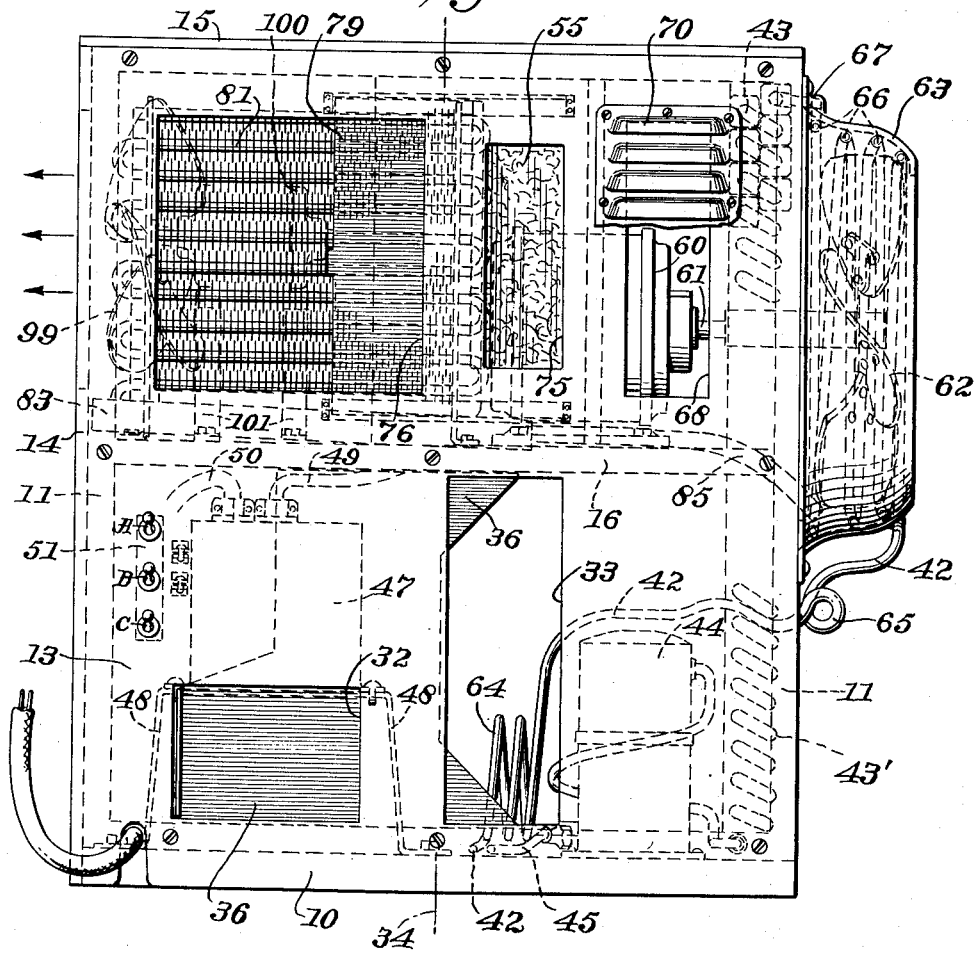

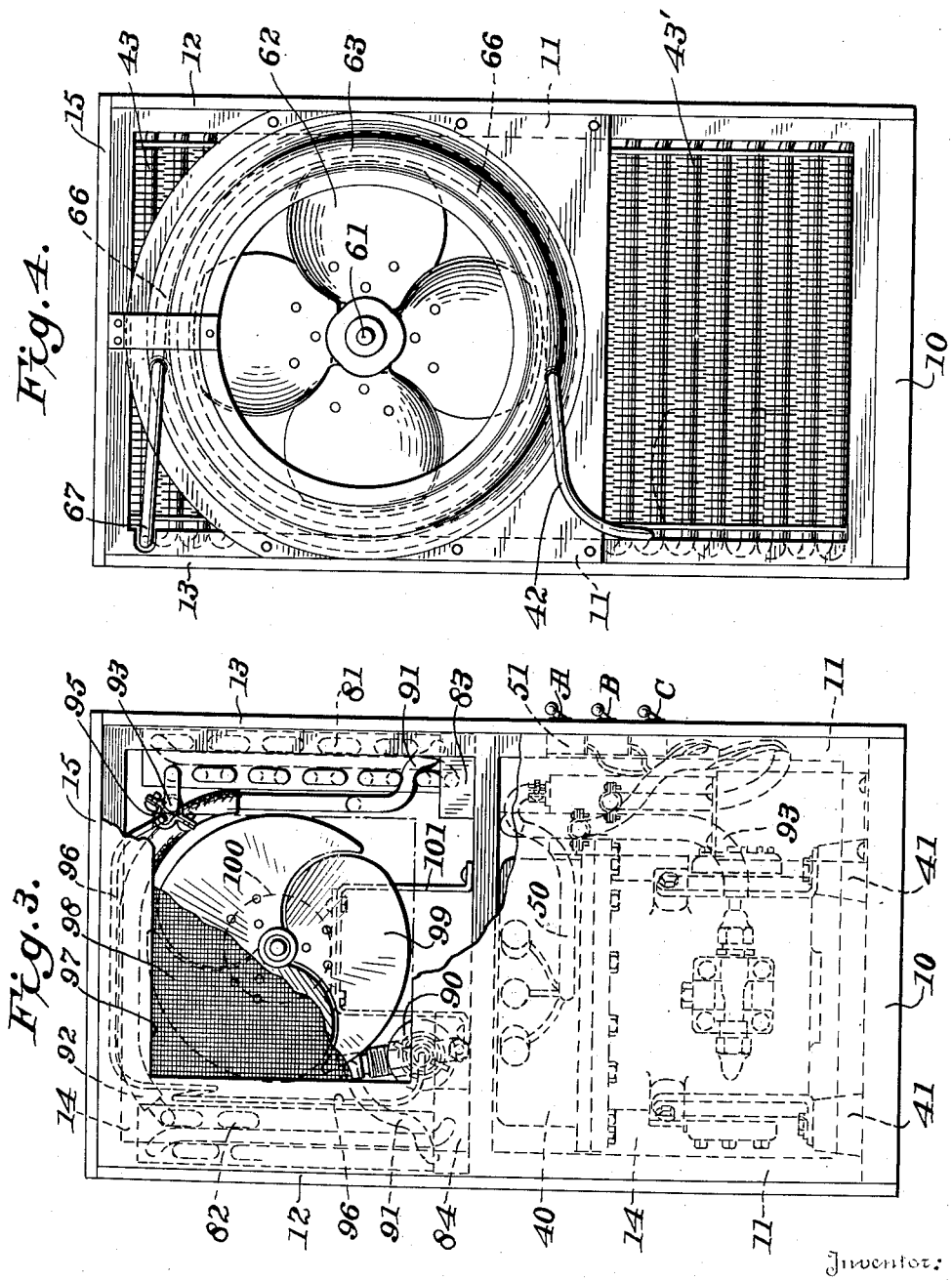

Sept. 26, 1944. R. F. ROPER 2,359,051
AIR CONDITIONING APPARATUS
Filed Oct. 24, 1941 9 Sheets-Sheet 4
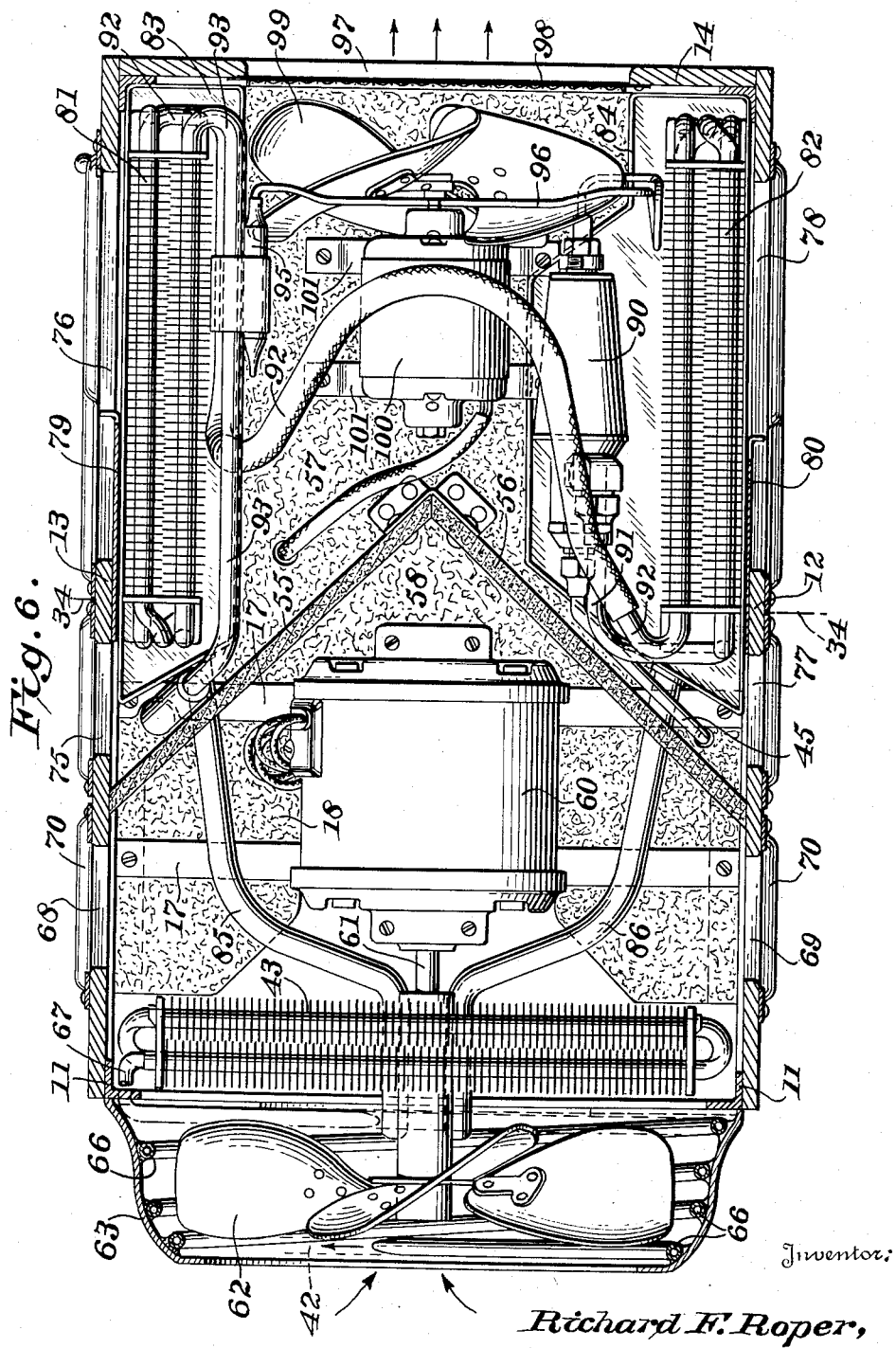
Inventor:
Richard F. Roper,
By Cushman Darby Cushman.
Attorneys.

Sept. 26, 1944. R. F. ROPER 2,359,051
AIR CONDITIONING APPARATUS
Filed Oct. 24, 1941 9 Sheets-Sheet 5

Inventor:
Richard F. Roper,

Sept. 26, 1944. R. F. ROPER 2,359,051
AIR CONDITIONING APPARATUS
Filed Oct. 24, 1941 9 Sheets-Sheet 6

Inventor:
Richard F. Roper,
By Cushman Darby Cushman
Attorneys

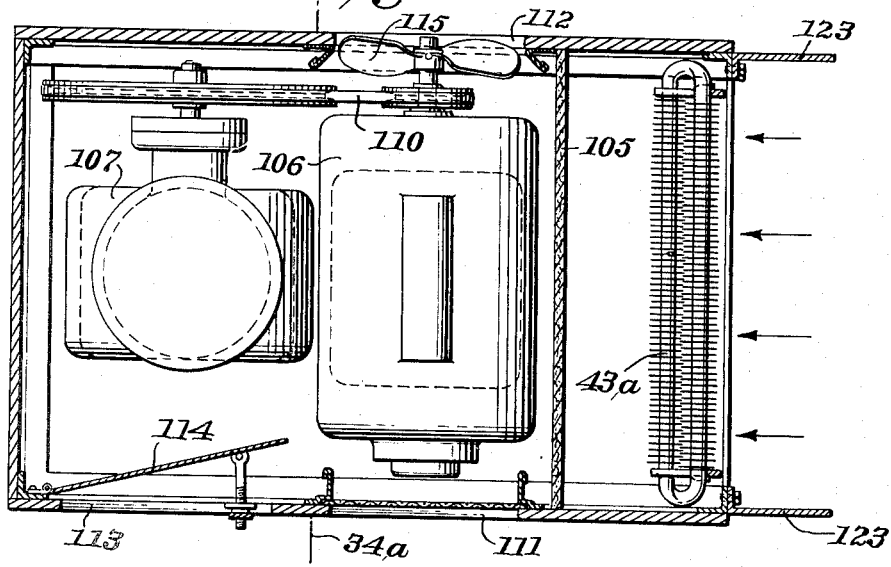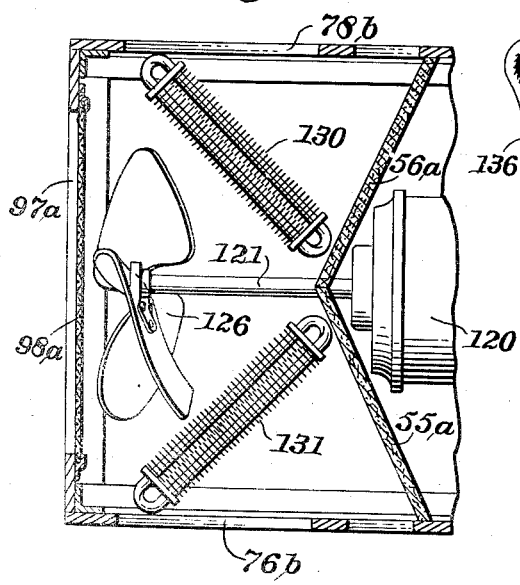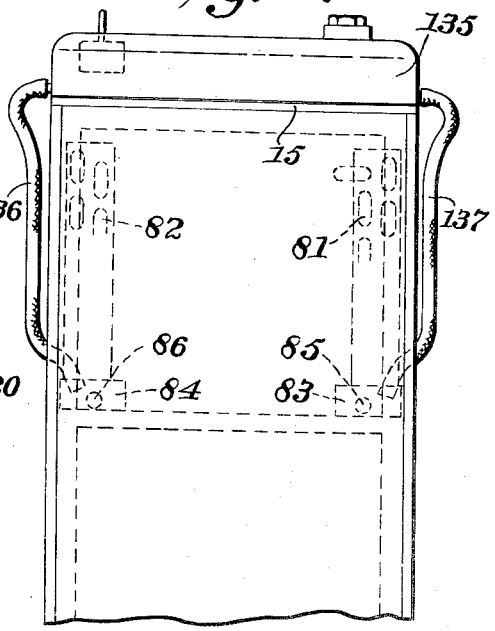

Sept. 26, 1944.  R. F. ROPER  2,359,051
AIR CONDITIONING APPARATUS
Filed Oct. 24, 1941  9 Sheets-Sheet 8
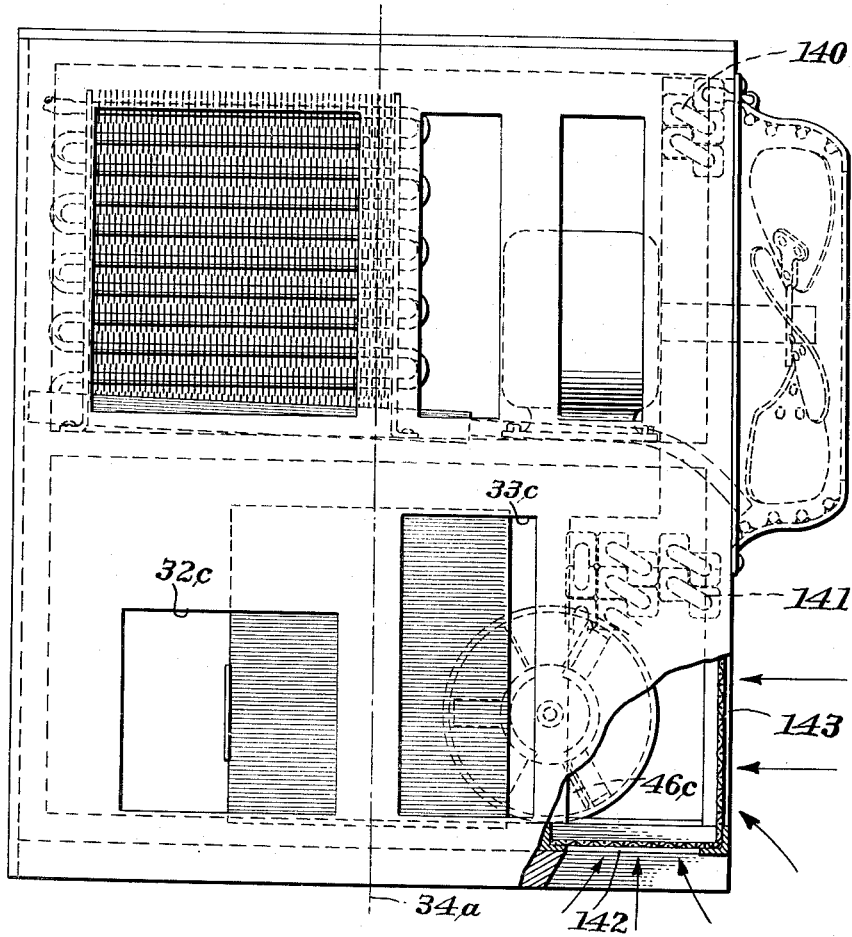
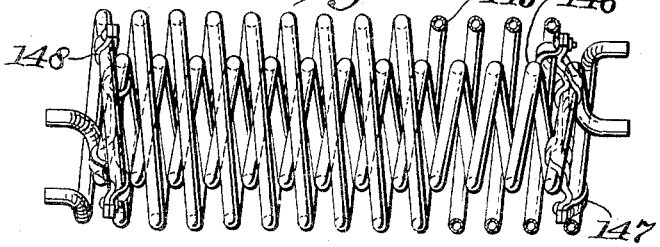
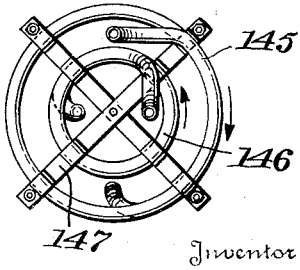
Inventor:
Richard F. Roper,
By Cushman Darby Cushman
Attorneys Sept. 26, 1944. R. F. ROPER 2,359,051
AIR CONDITIONING APPARATUS
Filed Oct. 24, 1941 9 Sheets-Sheet 9
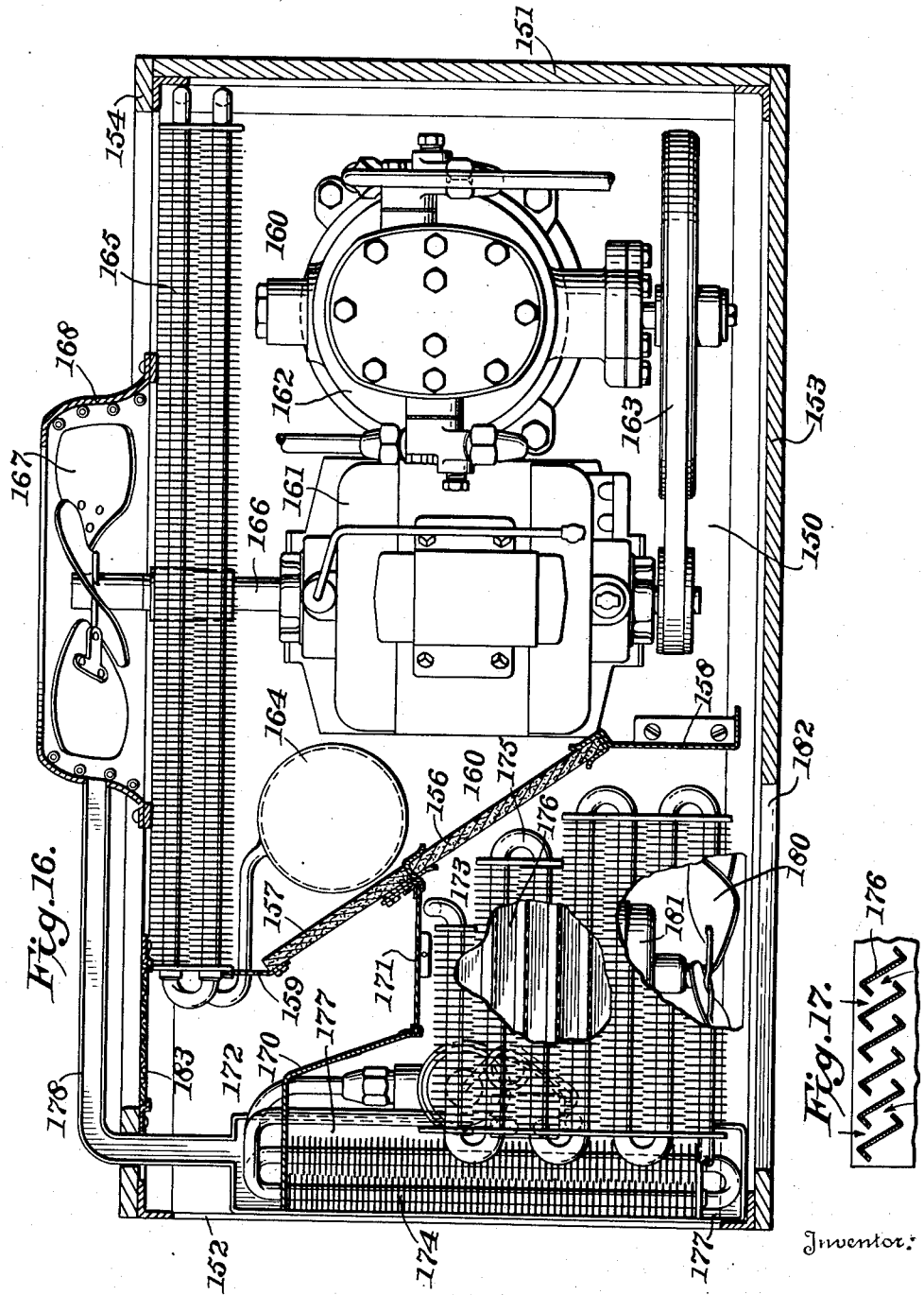
Inventor:
Richard F. Roper,
Attorneys Patented Sept. 26, 1944

2,359,051

UNITED STATES PATENT OFFICE 2,359,051

AIR CONDITIONING APPARATUS

Richard F. Roper, Washington, D. C., assignor, by mesne assignments, to Pleasantaire Corporation of America, Washington, D. C., a corporation of Delaware Application October 24, 1941, Serial No. 416,404

25 Claims. (Cl. 62—129)

The present invention relates to air conditioning apparatus adapted to cool and to dehumidify the air in a room or building. Although not confined to such use, the invention is particularly concerned with air conditioning units, adapted for installation in an opening in a building wall, such as a door or window opening.

The invention relates to air conditioning units of the type having self-contained refrigerating apparatus associated therewith, and wherein the high pressure or hot side of the apparatus is cooled primarily by the circulation of outdoor air and wherein indoor room air is circulated over the low pressure or cold side of the apparatus.

An object of the invention is to provide an unusually compact apparatus of relatively great capacity.

A further object of the invention is to provide an apparatus wherein the parts are so arranged and combined that a minimum space is occupied by the machine. A further object is to assemble and combine the units of the apparatus in such a manner that the same may be readily installed in casement window openings of standard size and construction, such as are conventionally used in office buildings, apartment houses and the like.

A further object of the invention is to provide, in an apparatus of the class described, improved means for cooling the air in and ventilating a room or building. To this end, the invention provides novel means for exhausting stale air from the room and for introducing fresh air thereinto.

A further object of the invention is to provide means for utilizing the cool, stale air exhausted from the room to assist in cooling desired portions of the hot side of the refrigerating apparatus, before that air is discharged to the outdoors.

A further object is to provide novel means for cooling fresh, outdoor air before it is introduced into the room.

An additional object is to provide novel means for increasing the available condenser area and the available evaporator area with an air conditioning unit enclosed in a casing of a particular cubic size.

Another object of the invention is to provide improved outdoor and indoor air circulating systems, for the purpose of decreasing the noise of the circulating means and the flowing air streams.

A further object of the invention is to provide means for producing one stream of air for cooling the refrigerant condenser and a secondary stream of air for cooling the compressor and its driving motor.

Another object of the invention is to provide novel means for adjustably proportioning the amounts of indoor and outdoor air utilized for cooling purposes and to similarly proportion the amounts of indoor and outdoor air admitted into the room.

A further object is to provide novel means for utilizing a single motor as a driving means for fans adapted respectively to circulate inside room air over the cold side of the refrigerating apparatus and outdoor air over the hot side thereof.

Other and further objects and advantages of the invention will be apparent to those skilled in the art from a consideration of the specific embodiments of the invention illustrated in the accompanying drawings and described below.

In the drawings:

Figure 2 is a similar view looking from the opposite side.

Figure 3 is an elevation of the indoor end of the apparatus, with certain parts broken away, looking from the right of Figure 1.

Figure 4 is an outdoor end elevation looking from the opposite direction.

Figure 6 is a horizontal sectional view through the upper section of Figures 1 and 2.

Figure 10 is a horizontal section through the lower portion of that apparatus.

Figure 11 is a fragmentary horizontal section of a further modification.

Figure 12 is an inside end elevation, showing a water supply system adapted for use with either modification.

Figure 13 is a side elevation of a further modification.

Figures 14 and 15 are side and end elevations of an improved condenser coil structure.

Figure 16 is a horizontal section, showing a further modification of the invention, and Figure 17 is a fragmentary detail of Figure 16.

Figure 1:
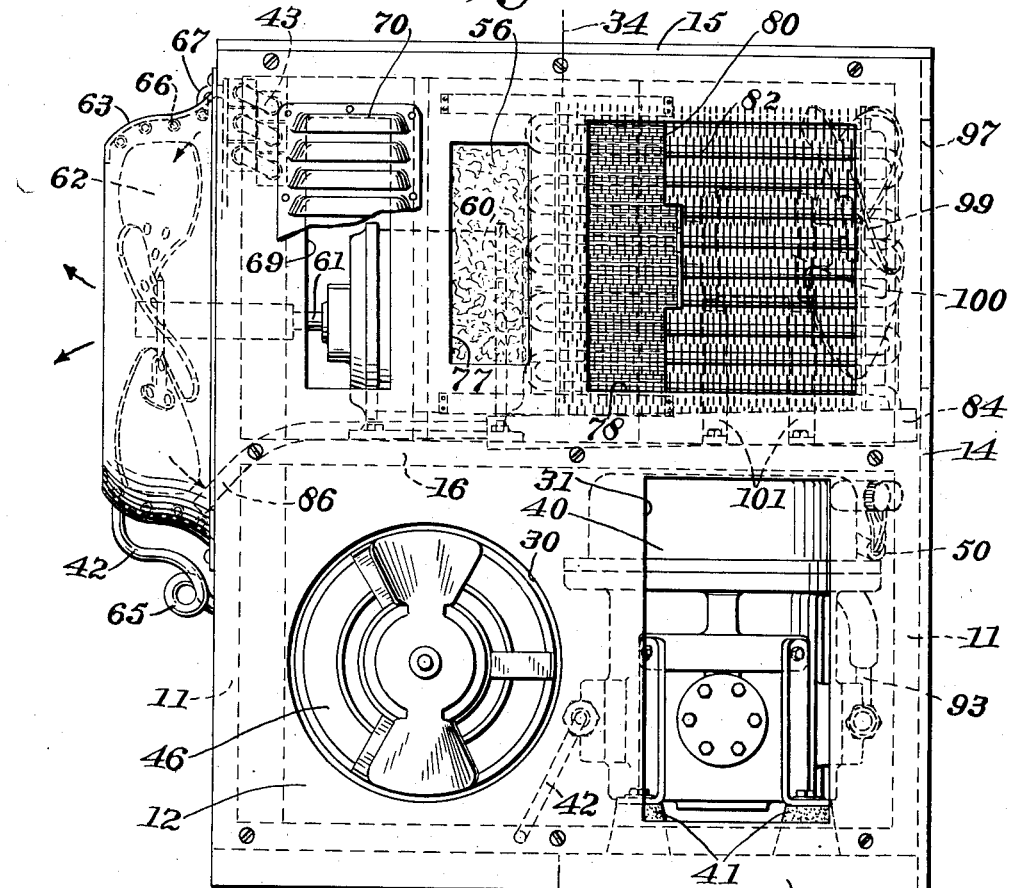
Figure 1 is a side elevation of one form of apparatus.

The apparatus of the present invention includes a casing made up of a base 10, angle frame members 11, side walls 12, 13, an inside end wall 14 and a top wall 15 secured thereto. The outside end of the casing is preferably left substantially open and unobstructed by an end wall, for purposes described below. The base, frame members and casing walls may be made of any preferred material, such as wood, metal, plastic material or composition board.

The frame includes intermediate, horizontal members 16 and transverse members 17 adapted to support a horizontal platform 18, for purposes to be described. The platform divides the casing into upper and lower sections, in which the several parts of the refrigerating apparatus are housed.

Figure 5:
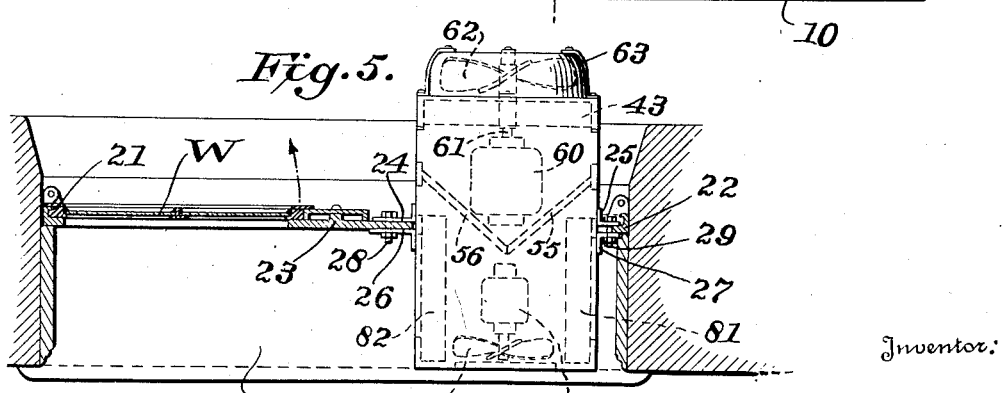
Figure 5 is a plan view on a smaller scale showing a preferred manner of installing the unit in a casement window frame.

The casing is preferably of considerably greater height and depth than width, and is so proportioned that it may be supported in casement window openings of the type that normally have a pair of casement windows hingedly secured to opposite side members for swinging movement to closed position adjacent a centrally disposed vertical jamb member. Referring to Figure 5, a casement window frame of this type is shown, comprising a sill 20, vertical side frame members 21, 22 and a central jamb member 23. Normally, a pair of casement windows, such as the one shown at 24, are hinged to the vertical members 21, 22 and are adapted to be closed against the central member 23. When the apparatus of the present invention is installed, one of the windows is removed from its hinges, and the unit is installed in the space between the central jamb member 23 and the side frame member, as at 22. The casing is supported upon the sash 20 and may be secured in place by a plurality of angle brackets 24, 25, 26, 27. One pair of brackets 24, 25 or the other pair 26, 27 may be previously secured to the casing and the other pair may be clamped to the first pair by bolts 28, 29, when the unit is installed in the window, thereby clamping the brackets firmly against the inner and outer faces of the frame members 22, 23. The brackets may be spaced apart vertically along the side walls of the casing or they may extend continuously from the sill to the top of the casing. It will be understood that the space between the top wall of the casing and the head of the window frame will be closed by any appropriate device, such as a supplemental window suitably secured in place or an impervious panel or the like.

Figure 7:
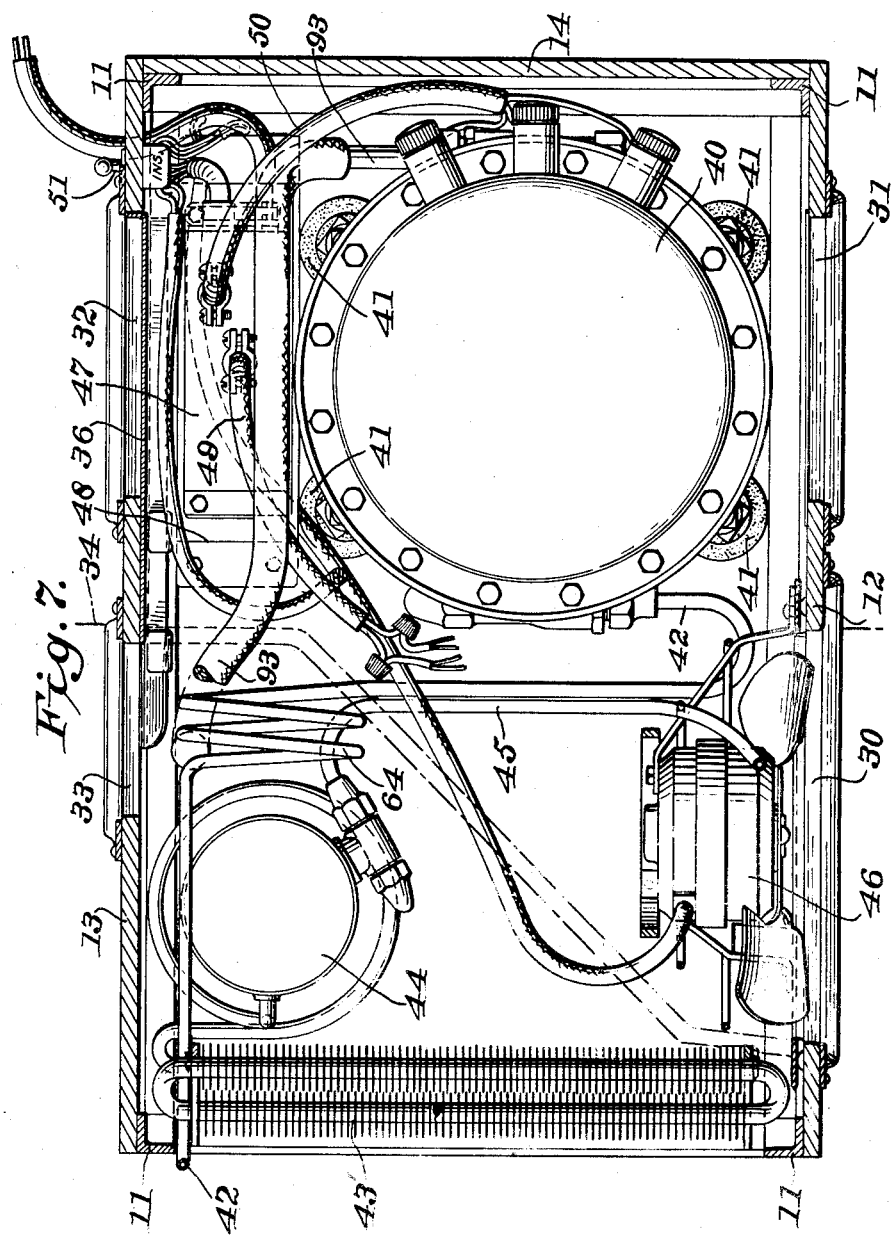
Figure 7 is a similar view through the lower portion thereof.

The lower portion of the side wall 12 adjacent the rear, outside portion thereof, is provided with an opening 30 (Figs. 1 and 7), while a similar opening 31 in the side wall inside the building may be provided, if desired. The opposite side wall 13, in its lower portion (Figs. 2 and 7), is provided with a pair of openings 32, 33, the former being positioned outwardly of the window line 34 and the latter inwardly thereof. The outside opening is relatively low and wide, whereas the inside opening is relatively tall and narrow. Within the casing and behind the side wall 13, there is mounted a slidable shutter 36, spanning the wall space between the openings and adapted to partially or completely close either opening, while correspondingly exposing the other opening. As shown in Figures 2 and 7, the shutter is in position closing the opening 32, while leaving the other opening 33 substantially completely open. By sliding the shutter toward the right in Figure 2 (toward the left in Figure 7), the opening 32 will be uncovered and the opening 33 correspondingly closed.

Within the lower section of the casing, below the horizontal partition 18, there is positioned a combined, hermetically sealed motor-compressor unit 40, supported by rubber pads 41 upon the base 10. A refrigerant line 42 leads from the compressor indirectly to a condenser 43 which extends substantially from the base 10 to the top 14 of the casing and is substantially coextensive in area with the rear end of the casing, said end being left substantially open except for the condenser positioned adjacent thereto. A refrigerant receiving tank 44, supported upon the base 10, receives liquid refrigerant from the condenser and delivers the same through an appropriate conduit 45 upwardly to an expansion valve and evaporator means hereinafter described.

The lower section of the casing also houses an exhaust fan and motor unit 46, supported behind the opening 30 and adapted to project air outwardly from the casing. The air stream created by this fan serves to cool the motor-compressor unit and is made up from variable amounts of outdoor and indoor air drawn into the casing through the openings 32, 33, respectively, the amounts depending upon the position of the shutter 36. When in the position shown in Figure 7, all of the air drawn through the casing by the fan 46 will be outdoor air, but, by shifting the shutter, cool, stale indoor air may be circulated over the motor-compressor unit 40 and exhausted to atmosphere.

Above the opening 36 there is a conventional electric motor starting condenser box 47, supported upon a bracket 48 and having conventional electric conduits 49, 50 extending to the several motors and to a switch assembly 51.

The upper section of the casing (Fig. 6) is divided by vertical partitions 55, 56 into an inner chamber 57 and outer chamber 58. It should be noted that the horizontal partition 18 is cut away adjacent its rear end, thereby establishing communication between the outer upper chamber 58 and the space below the horizontal partition, and that the condenser 43 extends upwardly through a portion of this space.

A fan motor 60, supported by the transverse frame members 17 in the outer chamber 58, is provided with a shaft 61 projecting outwardly through an appropriate opening in the condenser 43. At its outer end, the shaft carries an exhaust fan 62, enclosed peripherally by a Venturi hood or collar 63, appropriately secured to the vertical frame members 11. The hot refrigerant from the compressor is carried by conduit 42 through coils 64, 65 (Fig. 2) adapted to take up vibration and is then conducted to a large coil 66, appropriately secured as by soldering or brazing, to the inner surface of the hood 63 encircling the fan 62. The hood serves not only as an air flow controlling means, but acts as a trough for water of condensation, into which the fan blades dip, to spray the water against the highly heated conduits in the coil 66, for evaporation thereon, thereby removing a large amount of heat from the refrigerant in the coil.

From the coil 66, the refrigerant is led by a connection 67 to the upper end of the condenser, where it is cooled further, in a well known manner. Cooling air, circulated through the condenser by fan 62, flows into the casing through the lower portion 43' of the condenser, is drawn upwardly in the casing into the upper outer chamber and is then drawn outwardly through the upper portion of the condenser disposed by the fan 62. Additional openings for the supply of condenser cooling air are provided at 68, 69 in the side walls of the casing adjacent the upper portions thereof, communicating with the upper, outer chamber 58. Preferably, these openings are covered by louver plates 70, as shown in Figures 1 and 2.

The inner chamber 57 (Fig. 6) is provided with pairs of openings 75, 76 in the side wall 13 and with similar openings 77, 78 in the side wall 12, the openings 75, 77 being disposed outwardly of the window line 34 and the other openings inwardly thereof. Shutters 79, 80 span the spaces between the openings and are horizontally slidable, to vary, inversely, the effective size of the inside and outside openings, as previously explained in connection with the openings 32, 33.

Evaporators 81, 82, supported above the horizontal platform 18, are disposed inwardly of the side walls, behind the openings 76, 78, respectively. Drip pans 83, 84 are positioned below the evaporators, to collect water of condensation which forms on the evaporators. Conduits 85, 86 lead from these pans through the partitions 55, 56, and rearwardly and downwardly through the condenser 43, where they debouch into the lower portion of the hood 63. As previously explained, the water so delivered to this trough is in part thrown over the coil 66 and there evaporated, while any excess is carried outwardly with the condenser cooling air stream in the form of a fine spray or mist.

The liquid refrigerant is delivered by conduit 45 to an expansion valve 90 and from that valve to the lower portion of the evaporator 82 by a conduit 91. The upper end of that evaporator is connected to the lower end of the other by an insulated conduit 92 to the bottom of the evaporator 82, the upper end of which is connected by conduit 93 to the intake of the compressor, thereby completing the refrigerant cycle. The expansion valve 90 is controlled in a well known manner by a thermostatic bulb 95 disposed in heat exchange relation to the conduit 93 and connected to the valve by a tube 96.

The front wall of the casing above the platform 18 is provided with an opening 97 in which an appropriate grill 98 may be disposed. Behind the opening there is a fan 99 carried by the shaft of a fan motor 100, supported upon brackets 101 mounted on the platform 18. The fan 99 forces air outwardly from the upper inner chamber into the room and draws air inwardly into the chamber through the openings 76, 78 past the evaporators 81, 82, whereby the air is cooled and dehumidified before being recirculated into the room. Fresh outdoor air in desired amounts may be drawn inwardly through the openings 75, 77, depending upon the position of the shutters 79, 80, said air being guided to pass over the ends of the evaporators, to be cooled thereby.

The switch assembly 51 (Fig. 2) includes three switches A, B and C for independent control of certain of the electric motors. The circuit is such that all of the fan motors and the compressor motor may be operated simultaneously in the normal manner, or the indoor circulating air fan 99 may be operated independently of the other fans, or the indoor exhaust air fan 46 may be operated with or independently of the other fans and motors. Whenever the compressor motor is operating, the condenser cooling air fan 62 is also driven by its motor 60.

As a result of the arrangement of parts just described, an air conditioning unit of relatively great capacity is assembled in an unusually small space. The refrigerant condenser, extending over substantially the entire end of the casing with the cooling air circulating fan disposed outwardly thereof, may be of larger size than in other arrangements. Similarly, the evaporators, positioned adjacent both side walls of the upper inner chamber are of a greater capacity than would be possible with other casing arrangements. The use of a separate air stream to cool the motor-compressor unit makes it possible to use a larger compressor, since it is not necessary to employ a portion of the condenser cooling air for this purpose.

Figure 8:
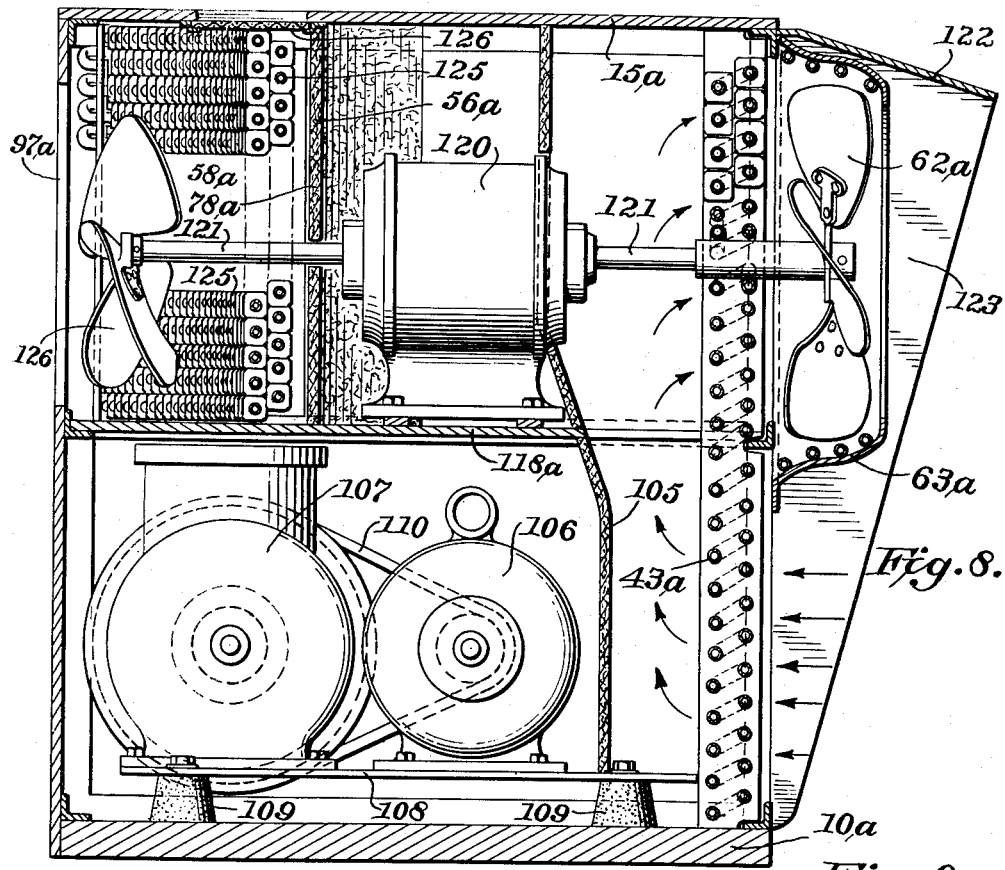
Figure 8 is a vertical, longitudinal section of a modified form of apparatus.
Figure 9:
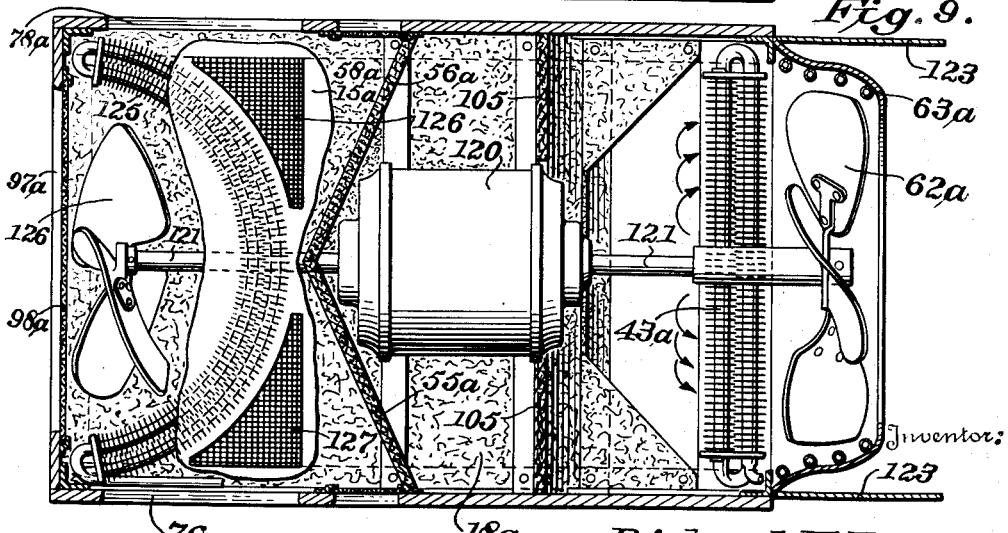
Figure 9 is a horizontal sectional view, partly in plan, of the apparatus shown in Figure 8.

The form of the invention shown in Figures 8–10 is preferred in some cases, where it is desired to use separate motors and compressors, instead of the hermetically sealed motor-compressor unit shown in the first form of the invention. The casing for the second form is generally similar to the first, but preferably includes a vertical transverse partition 105, extending upwardly from the base 10a to the top wall 15a. An electric motor 106 and a compressor 107 are mounted upon a chassis 108, supported in turn by rubber cushions 109 on the base 10a, the motor and compressor being interconnected in driving relation by a belt or chain 110.

As shown in Figure 10, the lower inner chamber defined by the casing walls, the partition 101 and the horizontal partition 18a is provided with openings 111, 112, disposed exteriorly of the window line 34a, and with an additional opening 113, disposed inside of the building and adapted to be controlled by a pivoted shutter 114. The shaft of motor 106 carries an exhaust fan 115, disposed in operative relation to the opening 112, whereby air for cooling the motor and compressor may be drawn inwardly through the openings 111, 113 in variable amounts, depending upon the position of the shutter 114.

The condenser 43a is arranged in substantially the same manner as previously described and is positioned outwardly of the vertical partition 105.

In the upper section (Figs. 8 and 9), above the horizontal partition 18a, there is a motor 120 having a forwardly and rearwardly extending shaft 121, the rear end of which projects through the upper portion of the condenser and carries an exhaust fan 62a, which may be disposed within a Venturi housing 63a, as previously described. A sun visor and weather protecting hood comprising a downwardly and outwardly inclined top wall 122 and side walls 123 may be carried by the outer end of the casing, to prevent the sun from shining directly upon the condenser.

The upper inner chamber 58a (Fig. 9) positioned forwardly of the partitions 55a, 56a, may contain evaporators of the type shown in Figure 6 or, on the other hand, a single evaporator 125 may be employed, the latter being arcuate in plan and generally semi-cylindrical in shape, with the concave side thereof facing the opening 97a in the front wall and with the convex side thereof facing the side openings 76a, 78a. Also, the top wall 15a is provided with grill covered openings 126, 127, behind the evaporator 125.

A fan 126, fast on the forward end of the shaft 121, is disposed within the space defined by the concave side of the evaporator 125 and behind the grill 98a in the front wall opening, whereby when the motor 120 is operated, inside room air is drawn inwardly through the side wall openings 76a, 78a, downwardly through the top wall openings 126, 127, and outwardly through the evaporator and then recirculated into the room. Simultaneously, the fan 62a circulates cooling air through the condenser and the space between the condenser and the vertical partition 105.

Since the electrical connections and the refrigerating circuit may be substantially the same as those previously described in connection with the first form of the invention, they need not be completely shown and described in the second form.

Figure 11 discloses a minor variation wherein a pair of evaporators 130, 131 are positioned in angularly disposed relation to the inside, upper side wall openings 76b, 78b. This arrangement avoids the necessity for providing a special, arcuate evaporator of the type shown in Figure 11 and accomplishes many of the advantages resulting from the form of invention shown in Figures 8-10. In other respects, the apparatus of Figure 11 may be the same as that described in connection with the second form of the invention.

In Figure 12, means are disclosed for supplying water to the condenser cooling air fan 62 or 62a, to assist in cooling the hot refrigerant in the coil 66, associated with the hood 63. In dry climates, there sometimes will not be a substantial condensation of moisture upon the evaporators, and only a slight amount of water, if any, will normally flow from the pans 83, 84 through the conduits 85, 86 to the bottom of the fan hood. In such cases, a tank 135 may be positioned upon the top wall 15 of the casing, inside the building, and conduits 136, 137, disposed inside or outside of the casing may lead to the drip pans 83, 84. Any appropriate means may be employed to control the rate of flow of water from the tank 135 to the drip pans. The water then flows through the normal conduits to the exhaust fan collar, where it is thrown upon the coil 66 by the fan blades, to assist in cooling the hot refrigerant in the usual manner.

In Figure 13, a further modification of the invention is shown, similar to the first form of the invention, except that the condenser is divided into an upper section 140 and a lower section 141, the latter being of considerably larger capacity and including a greater number of banks of condenser tubes than the former. Additional air for cooling the lower condenser 141 is admitted to the casing through a bottom wall opening 142, as well as through an opening 143 in the rear end wall of the casing. A fan 46c on the far side of the casing (Fig. 13) draws air through an opening 32c or 33c for cooling the compressor, which may be of the hermetic type as shown in the first form of the invention.

Instead of using a condenser of the multiple bank type, as shown at 141 in Figure 13, a special, high capacity condenser of the type shown in Figure 14 may be substituted. This condenser has an outer coil of tubing 145 and a second coil 146 disposed inwardly thereof, the coils being held in proper spaced relation by clamping spiders 147, 148. A condenser of this type may in some cases be advantageously positioned in the casing, above the bottom opening 142 and inwardly of the rear wall opening 143. Preferably, the latter openings are provided with filters, to prevent the introduction of dust and the like into the casing.

The form of the invention shown in Figure 16 is similar in many respects to the forms of the invention previously described, but differs therefrom in that all of the operating parts of the apparatus are positioned at substantially the same level. This type of unit is adapted for installation in conventional vertically sliding windows, as distinguished from casement windows. The general arrangement is, in some respects, similar to the disclosure of the prior patent to Paschal No. 2,120,208, but embodies numerous improvements thereof. The casing is provided with a floor 150, side walls 151, 152, an inside front wall 153, an outer wall 154 and a top wall, not shown. The interior of the casing is divided into two chambers by angularly disposed, vertical partitions 156, 157 secured to transverse partitions 158, 159. In the large chamber 160, there is a motor 161, connected in driving relation to a compressor 162 by a belt 163, a refrigerant tank 164 and a condenser 165, coextensive in area with the entire rear end of the chamber and substantially filling the rear end of the casing.

The motor shaft 166 of the motor 161 extends outwardly through an opening in the condenser 165 and carries an exhaust fan 167, enclosed in a hood 168, arranged after the manner previously described. Thus, the fan draws cooling air inwardly through the condenser into the chamber 160 and then draws the air outwardly through the portion of the condenser immediately in front of the fan. By this arrangement, a condenser of increased size and capacity may be employed, as compared with the arrangement of parts disclosed in the aforesaid patent to Paschal.

A partition 170 extends inwardly from the side wall of the casing and forwardly to a position where a vertically slidable gate 171 connects the same to the partitions 156, 157, thereby defining a fresh air intake chamber 172 and an indoor air circulating chamber 173. In the latter chamber, adjacent the substantially open end wall 152, there is positioned a vertically disposed evaporator 174, connected with a horizontally extending evaporator 175, disposed immediately below the top wall of the casing, said wall being provided with an opening, not shown, in which a grill may be positioned. Below the horizontally disposed evaporator 175, there are positioned a plurality of Z-bar baffles 176, as shown in Figure 17. These elements do not materially interfere with the flow of air through the evaporator, but are designed to catch any water of condensation that may drip therefrom. The Z-bars are preferably so inclined that they lead the water laterally to a position above the drip pan 177 disposed below the vertical evaporator 174. The water of condensation is led from this pan through a conduit 178 to the hood or collar 168, associated with the exhaust fan 167, where the water functions as previously described.

A fan 180 driven by a motor 181 in the chamber 173 circulates air into the room through the front wall opening 182. Normally the air is drawn into the casing through the end wall opening 152 through the evaporator 174 and downwardly through the evaporator 175, whereby it is de-humidified and cooled. If it is desired to introduce fresh, outdoor air, the gate 171 may be raised to establish a flow of air through a filter 183 in the rear end wall opening, so that air flows from the chamber 172 into the forwardly disposed chamber 173 and thence into the room.

Although the invention has been described with considerable particularity in connection with the modifications shown in the accompanying drawings, it must be understood that the invention is not limited to the details of construction or to the specific relations of parts described, as many modifications will readily occur to those skilled in the art, and all such modifications as come within the scope of the appended claims and their equivalents are to be considered as being within the invention.

I claim:

1. An air conditioning apparatus adapted to be mounted in an opening in a building wall, comprising casing means defining inside and outside walls of substantially equal dimensions and having inside and outside openings therein, partition means in the casing dividing the same into substantially isolated chambers, one of which occupies substantially the lower half of the casing and an outwardly disposed, rear portion of the upper half and the other of which occupies the inwardly disposed, front portion of the upper half, a compressor and driving means therefor in the lower portion of the first-mentioned chamber, a condenser extending substantially from top to bottom over the outwardly disposed, rear end of the casing, means for circulating outside air through one portion of the condenser, into the first-mentioned chamber, through that chamber outwardly through another portion of the condenser, an evaporator in the second chamber, and means for circulating room air through said chamber and over the evaporator to cool the same.

2. An air conditioning apparatus adapted to be mounted in an opening in a building wall, comprising casing means defining inside and outside openings, partition means in the casing dividing the same into substantially isolated chambers, one of which occupies substantially the lower half of the casing and an outwardly disposed, rear portion of the upper half and the other of which occupies the inwardly disposed, front portion of the upper half, a compressor and driving means therefor in the lower portion of the first-mentioned chamber, a condenser extending substantially from top to bottom over the outwardly disposed rear end of the casing, means for circulating outside air through one portion of the condneser, into the first-mentioned chamber, through that chamber and outwardly through another portion of the condenser, supplemental means for circulating air past said compressor to cool the latter, an evaporator in the second chamber, and means for circulating the room air through said chamber and over the evaporator to cool the same.

3. An air conditioning unit comprising a casing of greater height and depth than width and adapted to be supported in a casement window opening or the like, partition means isolating an upper, inner portion of the casing from the lower portion and the upper, rear, outer portion thereof, a refrigerant compressor in the lower portion, a condenser covering substantially the entire rear outside end of the casing, means for circulating air past the lower portion of the condenser into the lower chamber, upwardly into the upper rear outer chamber and outwardly through the upper portion of the condenser, an evaporator associated with the upper inner chamber, and means for circulating room air therethrough.

4. An air conditioning unit including casing means adapted to be mounted in a window opening and having an exteriorly disposed, rear portion and an interiorly disposed, front portion, a condenser extending substantially coextensive in area with the rear end of the exteriorly disposed portion, a compressor in the casing, inwardly of the condenser, means disposed exteriorly of the condenser for drawing outside air inwardly past one portion of the condenser and outwardly past another portion, partition means in the casing providing an evaporator chamber isolated from the condenser and the compressor, an evaporator in the evaporator chamber, and means for drawing room air into the casing past said evaporator and for recirculating the same into the room.

5. An air conditioning unit adapted to be supported in a window opening comprising a casing having front and rear walls disposed respectively inside and outside of the building, a refrigerant condenser extending over substantially the entire rear end of the casing outside of the building, and an air circulating fan positioned exteriorly of one portion of the condenser and adapted to draw condenser cooling air inwardly through another portion of the condenser into said casing and outwardly from the casing through the first-mentioned portion of the condenser.

6. An air conditioning unit adapted to be supported in a window opening or the like, comprising a casing having front and rear walls disposed respectively inside and outside of the building, a refrigerant condenser extending over substantially the entire rear end of the casing outside of the building, a fan motor disposed in the casing, a shaft extending from the motor through one portion of the condenser, an air circulating fan on the shaft positioned exteriorly of that portion of the condenser and adapted to draw condenser cooling air into the casing inwardly through another portion of the condenser and outwardly from the casing through the first-mentioned portion of the condenser.

7. An air conditioning unit comprising a casing adapted to be supported in a window opening or the like and having walls disposed inside and outside of the building, a refrigerant condenser extending over substantially the entire rear end of the casing outside of the building, an air circulating fan positioned exteriorly of the condenser adjacent one portion of the condenser, adapted to draw condenser cooling air inwardly through another portion of the condenser into said casing and outwardly from the casing through the first-mentioned portion of the condenser, a shroud surrounding said fan, a hot refrigerant conduit associated with said shroud and leading to said condenser, and means for delivering cooling water into the path of movement of the fan, to be thrown thereby upon said conduit.

8. An air conditioning unit adapted to be supported in a window opening or the like, comprising a casing disposed in part in the building and in part outside thereof, means partitioning the casing into chambers communicating respectively with the outside of the building and with the inside thereof, a refrigerant condenser closing substantially the entire rear outside end of the first-mentioned chamber, an exhaust fan disposed exteriorly of the condenser and of smaller area than the condenser, whereby said fan draws air inwardly through a portion of the condenser into the chamber and outwardly from the chamber through another portion thereof, an evaporator substantially coextensive in area with one end wall of the second-mentioned chamber and a fan for circulating inside room air through the evaporator and through the associated chamber and back into the room.

9. An air conditioning unit adapted to be supported in a window opening or the like, comprising a casing disposed in part in the building and in part outside thereof, means partitioning the casing into chambers communicating respectively with the outside of the building and with the inside thereof, a refrigerant condenser coextensive in area with substantially the entire rear outside end of the first-mentioned chamber, an exhaust fan disposed exteriorly of the condenser and of smaller area than the condenser, whereby said fan draws air inwardly through a portion of the condenser into the chamber and outwardly from the chamber through another portion thereof, evaporator means substantially coextensive in area with one end of the second-mentioned chamber and extending over at least a portion of the top of that chamber, a fan associated with the second chamber and adapted to draw room air thereinto by lateral flow through the end and downward flow through the top of the chamber and to expel the same back into the room.

10. An air conditioning unit adapted to be supported in a window opening or the like, comprising a casing disposed in part in the building and in part outside thereof, means partitioning the casing into chambers communicating respectively with the outside of the building and with the inside thereof, a refrigerant condenser and compressor in the outside chamber, means for circulating outdoor air through the outside chamber and the condenser to cool the condenser, evaporator means substantially coextensive in area with one end of the second mentioned chamber and extending over at least a portion of the top of that chamber, and a fan associated with the second mentioned chamber, adapted to draw room air thereinto by lateral flow through said one end and downward flow through said portion of the top of the chamber and past the evaporator means and to expel said air back into the room.

11. An air conditioning unit in accordance with claim 10 characterized by the inclusion of a plurality of troughs immediately below the portion of the evaporator means which extends over the top of the chamber, to collect water of condensation dripping from said evaporator means.

12. In an air conditioning unit of a type adapted to be supported in a window opening and having casing walls disposed inside and outside the building and a refrigerating apparatus in the casing, including a compressor and a condenser, means for circulating a stream of outside air over the condenser to cool the same, openings in the side walls of the casing inside and outside of the building, and additional means for circulating a second stream of air through said openings in controlled proportions and past the compressor.

13. In an air conditioning unit of a type adapted to be supported in a window opening and having casing walls disposed inside and outside the building and a refrigerating apparatus in the casing, including a compressor and a condenser, means for circulating a stream of outside air over the condenser to cool the same, openings in the side walls of the casing inside and outside of the building, additional means for circulating a second stream of air through said openings in variable, controlled proportions and past the compressor, and means for introducing into said compressor cooling air stream, inside room air for exhaust to the outdoors.

14. An air conditioning unit of the type adapted to be supported in a window opening or the like and including a refrigerating apparatus and casing means therefor having rear and front portions of substantially equal dimensions disposed respectively outside and inside of the building, said casing comprising lower and upper sections, the latter being divided by partition means into an isolated inner chamber and an outer chamber communicating with the lower section, a compressor in the lower section, a condenser substantially coextensive in area with the rear end of the casing, a fan associated with the condenser adjacent one portion thereof, whereby outside air is circulated inwardly through the other portion of the condenser and outwardly through the first-mentioned portion of the condenser, an evaporator associated with one wall of the inner chamber, and means for circulating inside room air through the evaporator and back into the room.

15. An air conditioning unit of the type adapted to be supported in a window opening or the like and including a refrigerating apparatus and casing means therefor having rear and front portions disposed respectively outside and inside of the building, said casing comprising lower and upper sections, the latter being divided by partition means into an isolated inner chamber and an outer chamber communicating with the lower section, a compressor in the lower section, a condenser substantially coextensive in area with the rear end of the casing, a fan disposed exteriorly of the condenser adjacent the upper portion thereof, a fan motor in the outer chamber connected to drive said fan, whereby outside air is circulated inwardly through the lower portion of the condenser into the lower section, upwardly into the outer chamber of the upper section, and outwardly through the upper portion of the condenser, an evaporator associated with said isolated inner chamber, and means for circulating inside room air through said isolated inner chamber and the evaporator and back into the room.

16. An air conditioning unit of the type adapted to be supported in a window opening or the like and including a refrigerating apparatus and casing means therefor having rear and front portions disposed respectively outside and inside of the building, said casing comprising lower and upper sections, the latter being divided by partition means into an isolated inner chamber and an outer chamber communicating with the lower section, a compressor in the lower section, a condenser substantially coextensive in area with the rear end of the casing, a fan disposed exteriorly of the condenser adjacent the upper portion thereof, a fan motor in the outer chamber connected to drive said fan, whereby outside air is circulated inwardly through the lower portion of the condenser into the lower section, upwardly into the outer chamber of the upper section, and outwardly through the upper portion of the condenser, evaporator means associated with both side walls of said isolated inner chamber, and means for circulating inside room air through said evaporator means into said isolated inner chamber and back into the room through the front wall of said inner chamber.

17. An air conditioning unit comprising a casing adapted to be supported in a window opening or the like and having front and rear portions disposed respectively inside and outside of the building, means dividing the casing into upper and lower sections, a partition in the lower section dividing the same into two chambers, a compressor in one chamber and a condenser in the other chamber, means for circulating a stream of outside air through the latter chamber only and over the condenser, and means for drawing inside room air exclusively into the compressor chamber to cool the compressor and for expelling the same to the outside.

18. An air conditioning unit comprising a casing adapted to be supported in a window opening or the like and having front and rear portions disposed respectively inside and outside the building, means dividing the casing into upper and lower sections, partition means dividing the upper section into an inner evaporator chamber communicating with the interior of the room and an outer, condenser chamber communicating with the outdoors, partition means dividing the lower section into an inner compressor chamber and an outer condenser chamber communicating with the first-mentioned compressor chamber and with the outdoors, an evaporator in the evaporator chamber, condenser means in the condenser chambers and a compressor in the compressor chamber, means for circulating room air through the evaporator chamber to cool the same, means for circulating a stream of outside air exclusively through the condenser chamber to cool the condenser means therein, and means for drawing room air exclusively into the compressor chamber to cool the compressor and for exhausting the same to the outside.

19. An air conditioning unit comprising a casing adapted to be supported in a window opening or the like and having portions disposed inside and outside the building, partition means in the casing dividing the same into inner and outer chambers, said casing having openings in its top wall, its side walls and its front wall communicating with the inner chamber, an arcuate shaped evaporator positioned in said inner chamber with its concave side facing the front wall opening, and with its convex side communicating with the side and top wall openings, a fan in the inner chamber disposed within the space between the concave side of the evaporator and the front wall opening, for circulating air into the chamber through the side and top wall openings and for recirculating the air into the room through said front wall opening after the air has passed the evaporator.

20. An air conditioning unit comprising a casing adapted to be supported in a window opening or the like and having portions disposed inside and outside the building, a substantially vertically disposed partition in the casing dividing the same into inner and outer chambers, a horizontal partition dividing the inner chamber into upper and lower compartments, a motor and a compressor in the lower compartment, a fan driven by said motor for circulating a stream of outdoor cooling air for the compressor through said compartment, means for mixing with said stream, indoor air for exhaust to the outside, an evaporator in the upper compartment, a condenser in the outer chamber substantially coextensive in area with the rear end thereof, and fan means for circulating indoor air over the evaporator and outdoor air over the condenser.

21. An air conditioning unit comprising a casing adapted to be supported in a window opening or the like and having front and rear portions disposed respectively inside and outside the building, a substantially vertically disposed partition in the casing dividing the same into inner and outer chambers, a horizontal partition dividing the inner chamber into upper and lower compartments a motor and a compressor in the lower compartment, a fan driven by said motor for circulating a stream of outdoor cooling air for the compressor through said compartment, means for mixing with said stream, indoor air for exhaust to the outside, an evaporator in the upper compartment, a condenser in the outer chamber substantially coextensive in area with the rear end thereof, a motor in an upper portion of the casing, a motor shaft extending forwardly and rearwardly therefrom, and a fan on each end of the shaft, one for circulating indoor air over the evaporator and the other for circulating outdoor air over the condenser.

22. In an air conditioning unit of the type adapted to be supported in a window opening and having casing walls disposed inside and outside of the building, means for drawing outside cooling air and stale room air into the casing in desired variable proportions and for expelling the same outdoors, comprising air circulating means, a pair of intake openings in one wall of the casing, one in the building and the other outside thereof, and shutter means for simultaneously and inversely varying the effective area of the inside and outside openings, whereby, as stale room air is taken into the casing by said circulating means for exhaust and for cooling purposes, the amount of outdoor cooling air taken into the casing is correspondingly reduced.

23. In an air conditioning unit of the type adapted to be supported in a window opening and having casing walls disposed inside and outside of the building, means for drawing outside cooling air and stale room air into the casing in desired variable proportions and for expelling the same outdoors, comprising air circulating means, a pair of spaced apart air intake openings in one side wall of the casing, one in the building and the other outside thereof, and a shutter plate spanning the space between the openings and mounted for movement for simultaneously and inversely varying the effective area of the inside and outside openings, whereby, as stale room air is taken into the casing by said circulating means for exhaust and for cooling purposes, the amount of outdoor cooling air taken into the casing is correspondingly reduced.

24. In an air conditioning unit of the type adapted to be supported in a window opening and having casing walls disposed inside and outside of the building, means for drawing indoor and outdoor air into the casing in desired variable proportions to be cooled and conditioned, and for expelling the same into the room, comprising air circulating means, a pair of air intake openings in one wall of the casing, one in the building and the other outside thereof, an evaporator in the path of the air circulated by said means, and shutter means for simultaneously and inversely varying the effective area of the inside and outside openings, whereby as the amount of outside air taken into the casing by said circulating means is increased, the amount of inside air taken into the casing is correspondingly reduced.

25. Apparatus in accordance with claim 24 characterized in that the air intake openings are spaced apart a substantial distance and in that the shutter means comprises a shutter plate spanning the space between the openings and mounted for movement for simultaneously and inversely varying the effective area of the inside and outside openings.

RICHARD F. ROPER.